(12) United States Patent
Yu et al.

(10) Patent No.: US 12,165,235 B2
(45) Date of Patent: Dec. 10, 2024

(54) MULTI-VIEW DISPLAY DEVICE AND DISPLAY CONTROL METHOD

(71) Applicants: Beijing BOE Display Technology Co., Ltd., Beijing (CN); BOE Technology Group Co., Ltd., Beijing (CN)

(72) Inventors: Shuhuan Yu, Beijing (CN); Wei Sun, Beijing (CN); Xin Duan, Beijing (CN); Jiantao Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/781,518

(22) PCT Filed: May 21, 2021

(86) PCT No.: PCT/CN2021/095121
§ 371 (c)(1),
(2) Date: Jun. 1, 2022

(87) PCT Pub. No.: WO2022/241757
PCT Pub. Date: Nov. 24, 2022

(65) Prior Publication Data
US 2024/0161220 A1    May 16, 2024

(51) Int. Cl.
*G06T 1/20*         (2006.01)
*G09G 3/00*         (2006.01)

(52) U.S. Cl.
CPC .............. *G06T 1/20* (2013.01); *G09G 3/001* (2013.01); *G09G 2320/028* (2013.01); *G09G 2330/023* (2013.01)

(58) Field of Classification Search
CPC .... G06T 1/20; G09G 3/001; G09G 2320/028; G09G 2330/023
USPC ................... 345/76, 519; 348/E13.059, 740
See application file for complete search history.

(56) References Cited

U.S. PATENT DOCUMENTS

| | | | |
|---|---|---|---|
| 2003/0016156 A1* | 1/2003 | Szeto | G01S 13/953 342/26 B |
| 2009/0002268 A1* | 1/2009 | Ueta | H04N 13/351 348/E13.059 |
| 2009/0185083 A1* | 7/2009 | Ohtoshi | H04N 21/43072 348/740 |
| 2011/0102413 A1* | 5/2011 | Hamer | H10K 50/82 345/76 |
| 2019/0045276 A1* | 2/2019 | Ruhm | H04N 21/6587 |
| 2020/0074909 A1* | 3/2020 | Zhao | H04N 9/69 |

(Continued)

FOREIGN PATENT DOCUMENTS

| | | |
|---|---|---|
| CN | 101409063 A | 4/2009 |
| CN | 101739912 A | 6/2010 |

(Continued)

*Primary Examiner* — Prabodh M Dharia
(74) *Attorney, Agent, or Firm* — IPro, PLLC

(57) ABSTRACT

A multi-view display device and a display control method are provided. The multi-view display device has a plurality of viewing angles and includes a plurality of logic boards, each of the logic boards corresponds to a respective one of the viewing angles, the logic board is configured to process and transmit image data of the viewing angle corresponding to the logic board, and the logic boards corresponding to the respective viewing angles are driven and controlled independently.

11 Claims, 2 Drawing Sheets

(56) References Cited

U.S. PATENT DOCUMENTS

| | | | | |
|---|---|---|---|---|
| 2020/0211507 A1* | 7/2020 | Clarke | ............... | G02B 26/004 |
| 2022/0187601 A1* | 6/2022 | Morozov | ............... | G09G 3/003 |
| 2022/0381639 A1* | 12/2022 | Kester | ............... | G08B 21/14 |

FOREIGN PATENT DOCUMENTS

| | | |
|---|---|---|
| JP | 2004233816 A | 8/2004 |
| WO | 2007097353 A1 | 8/2007 |

* cited by examiner

MULTI-VIEW DISPLAY DEVICE AND DISPLAY CONTROL METHOD

CROSS-REFERENCE TO RELATED APPLICATION

The present application is the U.S. national phase of PCT Application No. PCT/CN2021/095121 filed on May 21, 2021, which is incorporated herein by reference in its entirety.

TECHNICAL FIELD

The present disclosure relates to the field of display technology, in particular to a multi-view display device and a display control method.

BACKGROUND

A multi-view display device refers to a display device capable of observing images of different contents at different viewing angles. The multi-view display device may display simultaneously a plurality of contents being same as or different from each other through one display device, so as to meet different display requirements.

SUMMARY

In one aspect, the present disclosure provides in some embodiments a multi-view display device, the multi-view display device has a plurality of viewing angles and includes a plurality of logic boards, each of the logic boards corresponds to a respective one of the viewing angles, the logic board is configured to process and transmit image data of the viewing angle corresponding to the logic board, and the logic boards corresponding to the respective viewing angles are driven and controlled independently.

In another aspect, the present disclosure further provides in some embodiments a display control method for the multi-view display device in the embodiments of the present disclosure, including: rendering, by a Graphics Processing Unit (GPU) of the display device, the image data corresponding to different viewing angles; transmitting, by the GPU, the rendered image data to each of the logic board corresponding to the respective one of viewing angles; generating, by the logic board, control data in accordance with the received image data, and transmitting, by the logic board, the control data to a driving Integrated Circuit (IC); and controlling, by the driving IC, a display panel to display an image in accordance with the control data.

In a possible embodiment of the present disclosure, prior to rendering, by the GPU, the image data corresponding to the different viewing angles, the display control method further includes: obtaining a trigger condition for multi-view displaying; in the case of more than one trigger condition, determining a priority of each of the more than one trigger condition; and determining an image rendering rule in accordance with the priority of each of the trigger conditions.

In a possible embodiment of the present disclosure, a parameter for determining the trigger condition includes one or more of: an object tracking result, a two-Dimension/three-Dimension (2D/3D) display mode, a control coordinate, a touch detection, and an image update region.

In a possible embodiment of the present disclosure, controlling, by the driving IC, the display panel to display the image in accordance with the control data includes: receiving, by the driving IC, the control data corresponding to each viewing angle transmitted by the respective logic board; and sequencing, in accordance with a predetermined viewing angle sequencing order, data corresponding to a same pixel in the control data corresponding to the each viewing angle, to obtain pixel control data corresponding to each pixel.

In a possible embodiment of the present disclosure, prior to rendering, by the GPU, the image data corresponding to the different viewing angles, the display control method further includes: determining a first viewing angle among the plurality of viewing angles that is not required to display an image; and controlling a first logic board corresponding to the first viewing angle to be in a low power consumption state.

In a possible embodiment of the present disclosure, the sequencing, in accordance with the predetermined viewing angle sequencing order, the data corresponding to the same pixel in the control data corresponding to the each viewing angle includes: filling the pixel control data and data corresponding to the first viewing angle with blank data.

In a possible embodiment of the present disclosure, subsequent to the controlling the first logic board corresponding to the first viewing angle to be in the low power consumption state, the display control method further includes: controlling a circuit that is in the driving IC and corresponds to the first logic board to be in the low power consumption state.

In a possible embodiment of the present disclosure, prior to rendering, by the GPU, the image data corresponding to the different viewing angles, the display control method further includes: determining a first viewing angle among the viewing angles that is not required to display an image, and a second viewing angle among the viewing angles that is required to display an image; processing, by a first logic board corresponding to the first viewing angle, first sub-data to obtain a first control sub-signal, and processing, by a second logic board corresponding to the second viewing angle, second sub-data to obtain a second control sub-signal. Both the first sub-data and the second sub-data are included in the image data corresponding to the second viewing angle, and the first sub-data is different from the second sub-data.

In a possible embodiment of the present disclosure, controlling, by the driving IC, the display panel to display the image in accordance with the control data includes: sequencing, by the driving IC, the first control sub-signal and the second control sub-signal in accordance with a correspondence between the first sub-data and the image data and between the second sub-data and the image data; and controlling the display panel to display the image in accordance with the sequence of the first control sub-signal and the second control sub-signal.

BRIEF DESCRIPTION OF THE DRAWINGS

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a multi-view display device.

Figure 1:
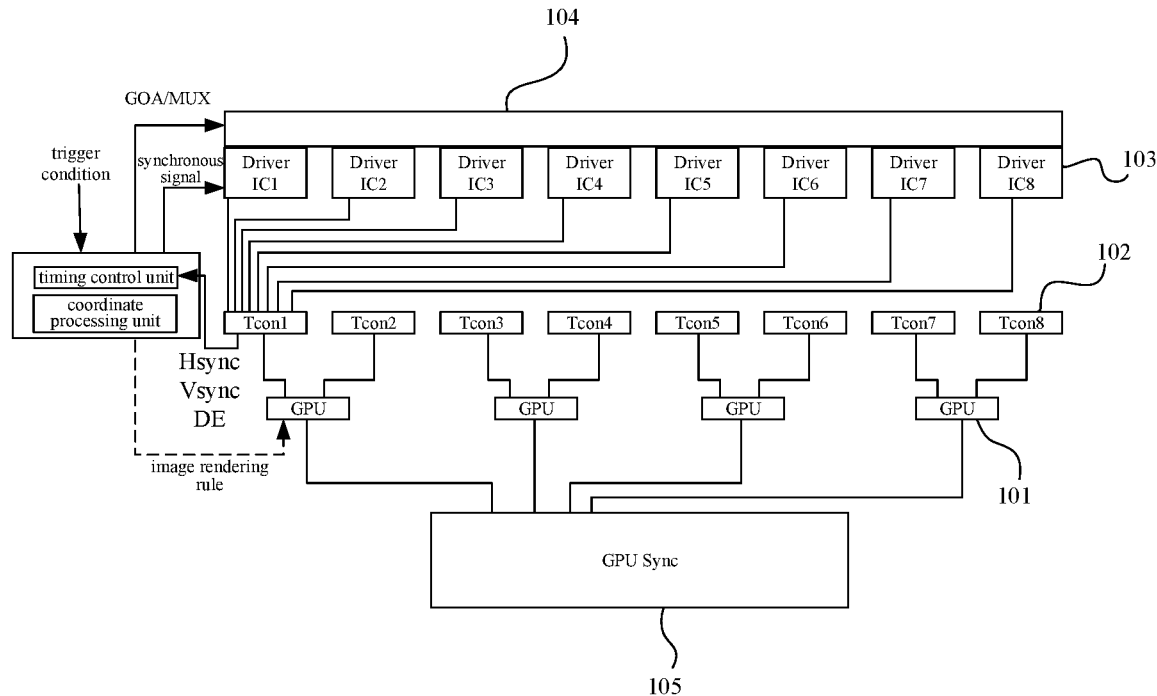
FIG. 1 is a schematic view showing a multi-view display device according to some embodiments of the present disclosure.

As shown in FIG. 1, in the embodiments of the present disclosure, the multi-view display device includes a Graphics Processing Unit (GPU) 101, logic boards (Tcon1 to Tcon8) 102, driving Integrated Circuits (IC) (driving IC1 to driving IC8) 103, and a display panel 104. It should be appreciated that, each of the logic boards 102 is electrically connected to each of the driving ICs 103, in the embodiments of the present disclosure, merely connection lines between one logic board Tcon1 and each of the driving ICs (driving IC1 to driving IC8) 103 are shown as an example, and connection lines between other logic boards Tcon1 and the driving ICs 103 are omitted.

The multi-view display device has a plurality of viewing angles, it should be appreciated that, when observing the display device from different viewing angles, the observed images are different. The multi-view display device includes a plurality of logic boards (Tcon1 to Tcon8) 102, each of the logic boards 102 corresponds to a respective one of the viewing angles, and the logic board 102 is configured to process and transmit image data of the viewing angle corresponding to the logic board.

For example, when signal format supported by the display panel 104 in the display device is a Low Voltage Differential Signaling (LVDS) signal and the image data input to the logic board 102 might include data signals, clock signals and control signals of pixels in different colors, the input signal may be converted into an LVDS signal in the logic board 102 and the display panel 104 is further controlled to display an image. Obviously, when the image format supported by the display panel 104 changes, the logic board 102 may also adaptively adjust the processing and transmission process of the image data.

The logic boards 102 corresponding to the respective viewing angles are driven and controlled independently. It should be appreciated that, power supplies and signal transmissions of different logic boards 102 are controlled independently, so as to control power supply and signal transmission of each of the logic boards 102 independently as needed.

In the embodiments of the present disclosure, due to the logic boards 102 corresponding to the respective viewing angles being driven and controlled independently, it is able to drive and control each of the logic boards in accordance with actual display requirements, thereby to improve the flexibility of use.

As shown in FIG. 1, in the embodiments of the present disclosure, a GPU synchronization (GPU Sync) board 105 is further provided. The GPU Sync board is configured to synchronize image rendering data of the GPU. When computation amount of the GPU is large, it is able to synchronize the rendered image data through the GPU Sync board, which is helpful to improve the transmission effect of the image data.

The present disclosure further provides in some embodiments a display control method.

Figure 2:
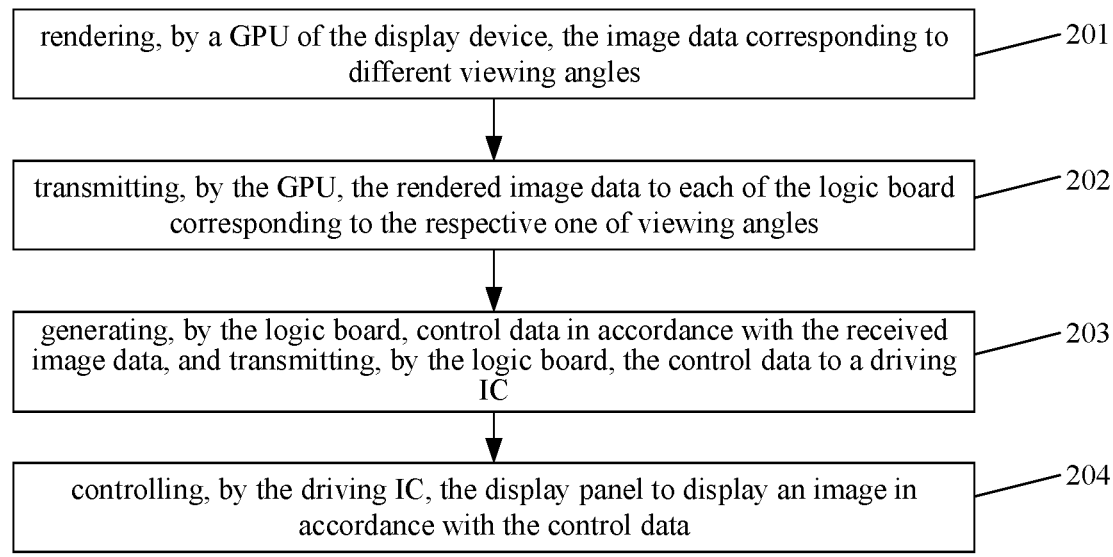
FIG. 2 is a flow chart of a display control method according to some embodiments of the present disclosure.

The display control method is applied to the above-mentioned multi-view display device, as shown in FIG. 2, in the embodiments of the present disclosure, the display control method includes the following steps.

Step 201: rendering, by a GPU of the display device, the image data corresponding to different viewing angles.

Step 202: transmitting, by the GPU, the rendered image data to each of the logic board corresponding to the respective one of viewing angles.

Step 203: generating, by the logic board, control data in accordance with the received image data, and transmitting, by the logic board, the control data to a driving IC.

Step 204: controlling, by the driving IC, the display panel to display an image in accordance with the control data.

In the embodiments of the present disclosure, the display device further includes a GPU, the GPU is configured to render the images to be displayed, and during implementation, the GPU is configured to render the images to be displayed at different viewing angles.

Taking the display device including eight viewing angles as an example, when the eight viewing angles need to display images, the GPU renders the image data of the eight images corresponding to the eight viewing angles. The rendered image data are transmitted to each logic board, the logic board processes and transmits the image data, converts the rendered image data into the control signal, and transmits the control signal to the driving IC, and the driving IC controls the display panel to display the images in accordance with the received control signal, thereby to realize multi-view image display.

In the embodiments of the present disclosure, Step 204 includes: receiving, by the driving IC, the control data corresponding to each viewing angle transmitted by the respective logic board; and sequencing, in accordance with a predetermined viewing angle sequencing order, data corresponding to a same pixel in the control data corresponding to the each viewing angle, to obtain pixel control data corresponding to each pixel.

Taking the multi-view display device including M pixels as an example, the image corresponding to each viewing angle transmitted by each logic board received by each driving IC includes the pixel control data of M pixels.

Figure 3:
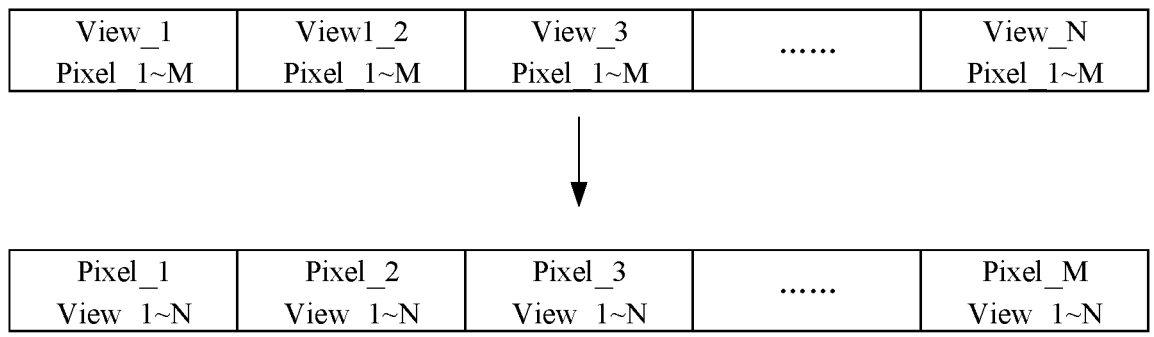
FIG. 3 is a schematic view showing data sequencing according to some embodiments of the present disclosure.

As shown in FIG. 3, the control data of the M pixels in an $n^{th}$ viewing angle are recorded as View_n-pixel_1~M. Therefore, when the multi-view display device includes eight viewing angles, the control data received by each driving IC includes: View_1-pixel_1~M, View_2-pixel_1~M, View_3-pixel_1~M, View_4-pixel_1~M, View_5-pixel_1~M, View_6-pixel_1~M, View_7-pixel_1~M and View_8-pixel_1~M.

As shown in FIG. 3, the control data are resequenced, and it should be appreciated that, the data required to be displayed by the $m^{th}$ pixel of the M pixels in the multi-view display device includes the pixel control data corresponding to the $m^{th}$ pixel of eight viewing angles. In the embodiments of the present disclosure, the pixel control data corresponding to the $m^{th}$ pixel of the eight viewing angles are recorded as View_1-pixel_m, View_2-pixel_m, ..., View_8-pixel_m respectively, which may be uniformly recorded as pixel_m-View_1~8. After the control data of the eight viewing angles are resequenced in accordance with the pixels, the resultant sequence is pixel_1-View_1~8, pixel_2-View_1~8, ..., pixel_M-View_1~8.

As a result, the pixel control data to be displayed for each pixel is obtained. When the image is to be displayed, by controlling the $m^{th}$ pixel to sequentially display the eight pieces of pixel control data in pixel_M-View_1~8, the image with eight viewing angles is enabled to be displayed.

It should be appreciated that, a display sequence of the image corresponding to the eight viewing angles may be sequenced in accordance with a predetermined viewing angle sequencing order; correspondingly, the sequencing order of each pixel and the eight pixel control data corresponding to the eight viewing angles may be adjusted.

In the embodiments of the present disclosure, prior to Step 201, the display control method further includes: obtaining a trigger condition for multi-view displaying; in the case of more than one trigger condition, determining a priority of each of the more than one trigger condition; and determining an image rendering rule in accordance with the priority of each of the trigger conditions.

In the embodiments of the present disclosure, the trigger condition refers to a condition for triggering the multi-view displaying, and for different situations, rendering mode may be adjusted accordingly when the GPU is used to render the images.

Figure 4:
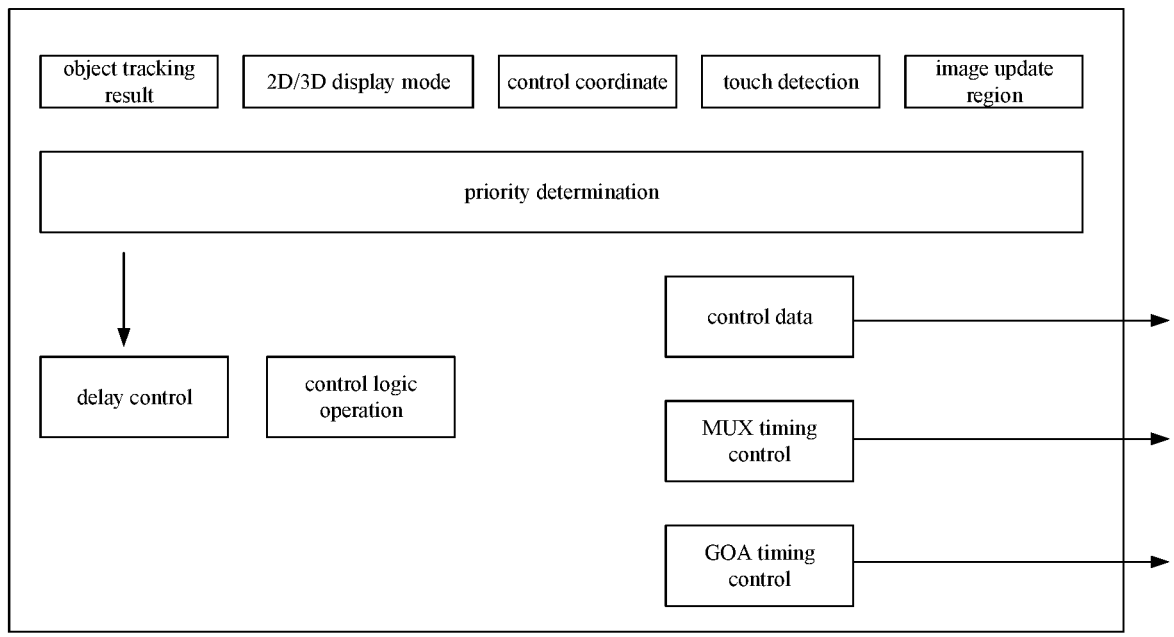
FIG. 4 is a schematic view showing a logic board according to some embodiments of the present disclosure.

As shown in FIG. 4, in the embodiments of the present disclosure, a parameter for determining the trigger condition includes one or more of: an object tracking result, a two-Dimension/three-Dimension (2D/3D) display mode, a control coordinate, a touch detection, and an image update region.

The object tracking result refers to a tracking result for an object observing the multi-view display device, e.g., the object tracking result may be realized through person tracking or eye tracking for a person. In the embodiments of the present disclosure, when a person or eyeball is detected in a direction corresponding to a certain viewing angle of the multi-view display device, it controls to display an image at that viewing angle, or it controls to display an image with a high quality at that viewing angle; if no person or eyeball is detected in the direction corresponding to the certain viewing angle of the multi-view display device, it may be considered that no user exists in the direction or the distance between the user and the multi-view display device is relatively far, it may control to do not display the image at that viewing angle, to enable the GPU not to render the image corresponding to the viewing angle, or it may control to display the image with a relatively low quality at that viewing angle to reduce the image rendering load of the GPU.

The 2D/3D display mode refers to that the multi-view display device selects either the 2D display mode or the 3D selection mode. When the display device displays the image in the 2D display mode or the 3D display mode, a corresponding image rendering manner may be selected accordingly.

The control coordinate refers to a position of a coordinate at which the multi-view display device is operated. For example, when a mouse is used as an input control apparatus for the multi-view display device, the control coordinate refers to the coordinate of the mouse. By determining the control coordinates, it is possible to determine the location where the control operation is performed. At this time, it may know that the user performs the control operation at this location. Correspondingly, the viewing angle may be controlled to display an image, and other viewing angles may be controlled not to display images; or the viewing angle may be controlled to display an image with a high quality, and other viewing angles may be controlled to display the image with a low quality. Correspondingly, the image rendering modes of the GPU for different viewing angles may be adjusted, so as to reduce the load of the GPU.

The touch detection refers to a detection result of a touch operation. By detecting the location of the touch operation, the direction where the user is located may be further determined, and the image rendering rule of the GPU may be further adjusted.

The image update region refers to a region where the image displayed by the display device is updated. For example, when the displayed image corresponding to a certain viewing angle needs to be updated and the displayed image corresponding to another viewing angle does not need to be updated, computing resources of the GPU may be allocated reasonably to increase the computing resources of the GPU for the updated image, so as to improve the rendering effect of the image, thereby to improve the display effect.

The priority refers to that the image rendering rule is determined in accordance with the priority of the above trigger condition. For example, in a possible embodiment of the present disclosure, it defines that the priorities of the object tracking result, the 2D/3D display mode, the control coordinate, the touch detection and the image update region are decreased in order, when it is detected that there is an object tracking result, it is in priority that the image rendering rule of the GPU is determined in accordance with the object tracking result; for another example, when there is no object tracking result and a 2D/3D display mode, but there is a detection result of control coordinate, the image render rule of the GPU is determined in accordance with a rule corresponding to the control coordinate.

It able to set different image rendering modes through setting the priorities of different trigger conditions, thereby to improve the rendering effect of images for different conditions.

As shown in FIG. 1 and FIG. 4, control process in the embodiments of the present disclosure may be summarized as follows: firstly, a trigger condition is determined, and an image rendering rule is determined in accordance with the trigger condition, and the GPU renders the image in accordance with the image rendering rule; then, the rendered image data is transmitted to the logic board, and the logic board generates control data in accordance with the image rendering data and transmits the control data to the driving IC to drive the display panel to display the image.

In the embodiments of the present disclosure, a GPU sync board may also be provided as needed, and the GPU sync board is configured to synchronize signals of the GPU.

The logic board is configured to provide synchronous control signals to a timing processing unit; to be specific, the logic board may provide synchronous control signals such as an effective data strobe signal (DE), a row synchronous signal (HSync) and a field synchronous signal (VSync). In addition, the timing processing unit generates corresponding timing signals, and a coordinate processing unit generates corresponding coordinate control signals, so as to realize the synchronous control of the signals.

It should be appreciated that, the coordinate processing unit and the timing processing unit may be arranged independently of the logic board, and the coordinate processing unit and the timing processing unit may also be integrated into the logic board, and thus will not be further particularly defined herein.

To be specific, the timing signals includes an gate driver on array (GOA) timing signal for GOA timing control, a multiplexer (MUX) timing signal for MUX timing control of a plurality of viewing angles, a synchronization signal, etc.

In the embodiments of the present disclosure, prior to Step 201, the display control method further includes: determining a first viewing angle among the plurality of viewing angles that is not required to display an image; and controlling a first logic board corresponding to the first viewing angle to be in a low power consumption state.

In the embodiments of the present disclosure, the first viewing angle refers to a viewing angle at which no image is required to be displayed. For example, the multi-view display device includes a total of eight viewing angles from viewing angle 1 to viewing angle 8, wherein the viewing angle 1, the viewing angle 3, the viewing angle 5, and the viewing angle 7 require to display the image, and the viewing angle 2, the viewing angle 4, the viewing angle 6 and the viewing angle 8 do not require to display the image, and the viewing angle 2, the viewing angle 4, the viewing angle 6 and the viewing angle 8 are the first viewing angles.

In the embodiments of the present disclosure, the low power consumption state may be realized through turning off the power supply of the first logic board, or enabling the first logic board to be in the sleep state, or stopping data transmission and processing of the first logical board.

When the first viewing angle exists, since each logic board is driven independently, it is able to reduce the power consumption of the multi-view display device through controlling the first logic board corresponding to the first viewing angle to be in the low power consumption state.

In the embodiments of the present disclosure, subsequent to the controlling the first logic board corresponding to the first viewing angle to be in the low power consumption state, the display control method further includes: controlling a circuit that is in the driving IC and corresponds to the first logic board to be in the low power consumption state.

Since each driving IC is connected to each logic board, and each driving IC includes a circuit dedicated for processing each logic board. It should be appreciated that, a certain part of the circuits are merely used to process data from a certain logic board and are not used to process data from other logic boards. In the embodiments of the present disclosure, the circuits corresponding to the first logic board are further controlled to be in the low power consumption state; for example, the circuits may be controlled to be in the low power consumption state by turning off an operational amplifier (OP) corresponding to the part of the circuits, so as to reduce the power consumption of the multi-view display device.

In the embodiments of the present disclosure, prior to rendering, by the GPU, the image data corresponding to the different viewing angles, the display control method further includes: determining a first viewing angle among the viewing angles that is not required to display an image, and a second viewing angle among the viewing angles that is required to display an image; processing, by a first logic board corresponding to the first viewing angle, first sub-data to obtain a first control sub-signal, and processing, by a second logic board corresponding to the second viewing angle, second sub-data to obtain a second control sub-signal. Both the first sub-data and the second sub-data are included in the image data corresponding to the second viewing angle, and the first sub-data is different from the second sub-data.

It should be appreciated that, when the first viewing angle that is not required to display an image exists, the computing resources that is provided by the first logical board corresponding to the first viewing angle are used to perform data processing and transmission for the second viewing angle that is required to display an image.

In the embodiments of the present disclosure, the viewing angle 1 is the first viewing angle that is not required to display an image, the viewing angle 2 is the second viewing angle that is required to display an image, and the logic board corresponding to the viewing angle 1 is configured to process a part of the image processing of the viewing angle 2.

Figure 5:
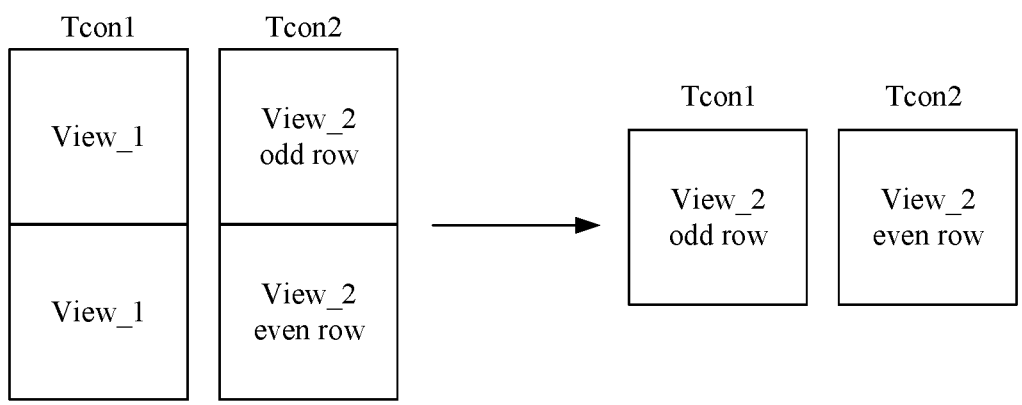
FIG. 5 is another schematic view showing data sequencing according to some embodiments of the present disclosure.

As shown in FIG. 5, for example, the odd row of data in the image data corresponding to the second viewing angle is the first sub-data, and the even row of data in the image data corresponding to the second viewing angle is the second sub-data. In the embodiments of the present disclosure, the second logic board Tcon2 corresponding to the second viewing angle is configured to process the second sub-data to obtain the second control sub-signal, and the first logic board Tcon1 corresponding to the first viewing angle is configured to process the first sub-data to obtain the first control sub-signal, so as to reduce the load of the second logic board Tcon2 and improve the processing and transmission speed of the image data.

In the embodiments of the present disclosure, controlling, by the driving IC, the display panel to display the image in accordance with the control data includes sequencing, by the driving IC, the first control sub-signal and the second control sub-signal in accordance with a correspondence between the first sub-data and the image data and between the second sub-data and the image data; and controlling the display panel to display the image in accordance with the sequence of the first control sub-signal and the second control sub-signal.

In the embodiments of the present disclosure, data is resequenced in the GPU, for example, an image corresponding to a second viewing angle is divided into first sub-data and second sub-data, the images corresponding to the first sub-data and the second sub-data are rendered respectively, and the rendered first sub-data and the rendered second sub-data are transmitted to the corresponding the first logic board Tcon1 and the second logic board Tcon2 respectively.

The first logic board Tcon1 and the second logic board Tcon2 obtain a first control sub-signal and a second control sub-signal respectively after processing the first sub-data and the second sub-data, the first control sub-signal corresponds to control data of an odd row, and the second control sub-signal corresponds to control data of an even row.

Next, in the driving IC, the first control sub-signal and the second control sub-signal are sequenced to restore the correspondence between the first and second control sub-signals and the original image data. As a result, it is able to display the image corresponding to the original second viewing angle when the driving IC drives the display panel in accordance with the first sub-signal and the second control sub-signal.

In the embodiments of the present disclosure, the test shows that refresh rate of displaying may be increased by about 20%, and the display effect may be improved effectively.

In the embodiments of the present disclosure, the sequencing, in accordance with the predetermined viewing angle sequencing order, the data corresponding to the same pixel in the control data corresponding to the each viewing angle includes: filling the pixel control data and data corresponding to the first viewing angle with blank data.

The pixel control data corresponding to the $m^{th}$ pixel are recorded as View_1-pixel_m, View_2-pixel_m, . . . , View_8-pixel_m. If the viewing angle 1 requires to display an image, View_1-pixel_m retains the pixel control data of the viewing angle 1, if the viewing angle 2 does not require to display an image, the pixel control data View_2-pixel_m corresponding to the viewing angle 2 are filled with blank data, e.g., the pixel control data may be adjusted to be 0, so as to ensure that the whole data structure of the pixel control data of each pixel is not changed, thereby to simplify the control process.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure. The scope of the present disclosure is defined by the claims.

What is claimed is:

1. A display control method for a multi-view display device, wherein the multi-view display device has a plurality of viewing angles and comprises a plurality of logic boards, each of the logic boards corresponds to a respective one of the viewing angles, the logic board is configured to process and transmit image data of the viewing angle corresponding to the logic board, and the logic boards corresponding to the respective viewing angles are driven and controlled independently; the display control method comprises:
   rendering, by a Graphics Processing Unit (GPU) of the display device, the image data corresponding to different viewing angles;
   transmitting, by the GPU, the rendered image data to each of the logic board corresponding to the respective one of viewing angles;
   generating, by the logic board, control data in accordance with the received image data, and transmitting, by the logic board, the control data to a driving Integrated Circuit (IC); and
   controlling, by the driving IC, a display panel to display an image in accordance with the control data,
   wherein controlling, by the driving IC, the display panel to display the image in accordance with the control data comprises:
   receiving, by the driving IC, the control data corresponding to each viewing angle transmitted by the respective logic board; and
   sequencing, in accordance with a predetermined viewing angle sequencing order, data corresponding to a same pixel in the control data corresponding to the each viewing angle, to obtain pixel control data corresponding to each pixel,
   wherein prior to rendering, by the GPU, the image data corresponding to the different viewing angles, the display control method further comprises:
   determining a first viewing angle among the plurality of viewing angles that is not required to display an image; and
   controlling a first logic board corresponding to the first viewing angle to be in a low power consumption state,
   wherein the sequencing, in accordance with the predetermined viewing angle sequencing order, the data corresponding to the same pixel in the control data corresponding to the each viewing angle comprises: filling the pixel control data and data corresponding to the first viewing angle with blank data.

2. The display control method according to claim 1, wherein prior to rendering, by the GPU, the image data corresponding to the different viewing angles, the display control method further comprises:
   obtaining a trigger condition for multi-view displaying;
   in the case of more than one trigger condition, determining a priority of each of the more than one trigger condition; and
   determining an image rendering rule in accordance with the priority of each of the trigger conditions.

3. The display control method according to claim 2, wherein a parameter for determining the trigger condition comprises one or more of: an object tracking result, a two-Dimension/three-Dimension (2D/3D) display mode, a control coordinate, a touch detection, and an image update region.

4. The display control method according to claim 1, wherein subsequent to the controlling the first logic board corresponding to the first viewing angle to be in the low power consumption state, the display control method further comprises: controlling a circuit that is in the driving IC and corresponds to the first logic board to be in the low power consumption state.

5. A display control method for a multi-view display device, wherein the multi-view display device has a plurality of viewing angles and comprises a plurality of logic boards, each of the logic boards corresponds to a respective one of the viewing angles, the logic board is configured to process and transmit image data of the viewing angle corresponding to the logic board, and the logic boards corresponding to the respective viewing angles are driven and controlled independently; the display control method comprises:
   rendering, by a Graphics Processing Unit (GPU) of the display device, the image data corresponding to different viewing angles;
   transmitting, by the GPU, the rendered image data to each of the logic board corresponding to the respective one of viewing angles;
   generating, by the logic board, control data in accordance with the received image data, and transmitting, by the logic board, the control data to a driving Integrated Circuit (IC); and
   controlling, by the driving IC, a display panel to display an image in accordance with the control data,
   wherein controlling, by the driving IC, the display panel to display the image in accordance with the control data comprises:
   receiving, by the driving IC, the control data corresponding to each viewing angle transmitted by the respective logic board; and
   sequencing, in accordance with a predetermined viewing angle sequencing order, data corresponding to a same pixel in the control data corresponding to the each viewing angle, to obtain pixel control data corresponding to each pixel,
   wherein prior to rendering, by the GPU, the image data corresponding to the different viewing angles, the display control method further comprises:
   determining a first viewing angle among the plurality of viewing angles that is not required to display an image; and controlling a first logic board corresponding to the first viewing angle to be in a low power consumption state, wherein subsequent to the controlling the first logic board corresponding to the first viewing angle to be in the low power consumption state, the display control method further comprises: controlling a circuit that is in the driving IC and corresponds to the first logic board to be in the low power consumption state.

6. The display control method according to claim 5, wherein prior to rendering, by the GPU, the image data corresponding to the different viewing angles, the display control method further comprises:

obtaining a trigger condition for multi-view displaying;

in the case of more than one trigger condition, determining a priority of each of the more than one trigger condition; and determining an image rendering rule in accordance with the priority of each of the trigger conditions.

7. The display control method according to claim 6, wherein a parameter for determining the trigger condition comprises one or more of: an object tracking result, a two-Dimension/three-Dimension (2D/3D) display mode, a control coordinate, a touch detection, and an image update region.

8. A display control method for a multi-view display device, wherein the multi-view display device has a plurality of viewing angles and comprises a plurality of logic boards, each of the logic boards corresponds to a respective one of the viewing angles, the logic board is configured to process and transmit image data of the viewing angle corresponding to the logic board, and the logic boards corresponding to the respective viewing angles are driven and controlled independently; the display control method comprises:

rendering, by a Graphics Processing Unit (GPU) of the display device, the image data corresponding to different viewing angles;

transmitting, by the GPU, the rendered image data to each of the logic board corresponding to the respective one of viewing angles;

generating, by the logic board, control data in accordance with the received image data, and transmitting, by the logic board, the control data to a driving Integrated Circuit (IC); and controlling, by the driving IC, a display panel to display an image in accordance with the control data, wherein controlling, by the driving IC, the display panel to display the image in accordance with the control data comprises:

receiving, by the driving IC, the control data corresponding to each viewing angle transmitted by the respective logic board; and sequencing, in accordance with a predetermined viewing angle sequencing order, data corresponding to a same pixel in the control data corresponding to the each viewing angle, to obtain pixel control data corresponding to each pixel, wherein prior to rendering, by the GPU, the image data corresponding to the different viewing angles, the display control method further comprises:

determining a first viewing angle among the viewing angles that is not required to display an image, and a second viewing angle among the viewing angles that is required to display an image;

processing, by a first logic board corresponding to the first viewing angle, first sub-data to obtain a first control sub-signal, and processing, by a second logic board corresponding to the second viewing angle, second sub-data to obtain a second control sub-signal, wherein both the first sub-data and the second sub-data are comprised in the image data corresponding to the second viewing angle, and the first sub-data is different from the second sub-data.

9. The display control method according to claim 8, wherein controlling, by the driving IC, the display panel to display the image in accordance with the control data comprises:

sequencing, by the driving IC, the first control sub-signal and the second control sub-signal in accordance with a correspondence between the first sub-data and the image data and between the second sub-data and the image data; and controlling the display panel to display the image in accordance with the sequence of the first control sub-signal and the second control sub-signal.

10. The display control method according to claim 8, wherein prior to rendering, by the GPU, the image data corresponding to the different viewing angles, the display control method further comprises:

obtaining a trigger condition for multi-view displaying;

in the case of more than one trigger condition, determining a priority of each of the more than one trigger condition; and determining an image rendering rule in accordance with the priority of each of the trigger conditions.

11. The display control method according to claim 10, wherein a parameter for determining the trigger condition comprises one or more of: an object tracking result, a two-Dimension/three-Dimension (2D/3D) display mode, a control coordinate, a touch detection, and an image update region.

* * * * *